3,679,623
COMPOSITIONS OF POLY (ALKYL VINYL ETHER/MALEIC ANHYDRIDE) WITH PHOSPHATE ESTER SURFACTANT
Thomas S. Mestetsky and Edwin M. Smolin, Easton, Pa., assignors to GAF Corporation, New York, N.Y.
No Drawing. Filed June 12, 1970, Ser. No. 45,893
Int. Cl. C08f 29/12
U.S. Cl. 260—31.2 R
6 Claims

ABSTRACT OF THE DISCLOSURE

Film forming compositions, which give hard glossy, water-dispersible films and which are particularly useful for coating or saturating fibrous sheet material such as paper and woven and non-woven textiles, are prepared by compounding (intimately mixing), in solution, 1 to 5 parts by weight of a water-soluble phosphate ester surfactant with 1 part by weight of an alkyl vinyl ether polymer selected from the group consisting of homopolymers of alkyl vinyl ethers in which the alkyl groups have from 1 to 18 alkyl carbon atoms and copolymers of such alkyl vinyl ethers with each other or with maleic anhydride. Such compositions when applied to paper and similar sheet material as a coating can serve both as a remoistenable adhesive and a heat sealable adhesive. They can also be applied to paper etc. either as a coating or saturant to decrease the porosity of the sheet, increase its stiffness or tensile strength. The water sensitivity of the films produced by such compositions may be modified by incorporating a wood rosin ester (which may be either hydrogenated or unhydrogenated) or a hydrocarbon resin in the composition. Various other additives, such as pigments to increase the opacity of the resulting films, may also be incorporated in the compositions.

---

This invention relates to novel film-forming compositions comprising from 1 to 5 parts by weight of a water-soluble phosphate ester surfactant compounded with 1 part by weight of certain alkyl vinyl ether polymers.

We have discovered that such film-forming compositions possess properties which render them particularly useful as coatings and saturants for paper and other fibrous sheet materials. These novel compositions and the films produced therefrom are hard, glossy and water dispersible. They are also soluble or dispersible in such volatile organic solvents as ketones, esters, and alcohols and mixtures thereof with each other or with volatile aromatic hydrocarbon solvents such as benzene, toluene and petroleum based alkylated benzene solvents. They may be applied to paper and similar sheet material, from either an aqueous or volatile organic solvent medium, to produce coatings having both remoistenable and heat-sealable adhesive properties. They can also serve, when applied as either a coating or a saturant, as a coating or size to decrease the porosity of the paper or other flexible sheet substrate on which they are used, to prevent the migration of subsequently applied coatings or printing, to increase the stiffness and/or tensile strength of the substrate etc.

Many of the coatings applied to paper and similar flexible sheet substrates are based on dextrin and are applied from an aqueous medium. When such dextrin based coatings are applied to a flexible sheet substrate as an adhesive coating they possess only remoistenable adhesive properties. By way of contrast the coatings produced by the use of the compositions of the present invention possess both remoistenable and heat sealable properties. Also since the compositions are soluble or dispersible in volatile organic solvents, they may be applied from an organic solvent medium, and thus obviate certain disadvantages of aqueous systems such as tendency to curl fibrous substrates and the relatively high heat and time requirements to dry coatings applied from an aqueous system. The compositions of the present invention are particularly valuable as coatings and saturants for water sensitive or dispersible substrates, since they can be applied thereto, from a solvent system, with minimal potential destruction of the water sensitive substrate.

It is therefore an object of the present invention to provide a film forming composition which can be applied to flexible sheet substrates, such as paper, from either an aqueous or solvent system, to provide an adhesive coating thereon which possesses both remoistenable and heat sealable adhesive properties; to increase the stiffness, strength and/or opacity of the substrate, and which has minimal tendency to induce curl of the substrate, which may be dried at a relatively low temperature and in a relatively short time, and which can be applied to many water sensitive substrates with minimal potential destruction of the substrate. Other and further objects of this invention will be apparent as this description progresses.

The water soluble phosphate ester surfactants employed in the compositions of the present invention may be represented by the following formula:

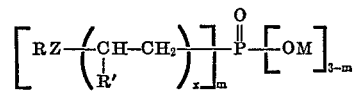

wherein:

RZ represents the hydrophobic residue of a compound having an active hydrogen atom and selected from the group consisting of alkylphenols, aliphatic alcohols, fatty acids, fatty amines, fatty amides, rosin amines, long chain sulfonamides, long chain-substituted aryl sulfonamides, and high molecular weight mercaptans; preferably R is alkylphenyl having 6 to 20 alkyl carbon atoms in one or more alkyl groups on the benzene ring, or is an alkyl group of from 6 to 20 carbon atoms and Z is preferably —O—, but may be —COO—, —NR″—, —NCOR″—, —SO$_2$NR″—, or —S—, in which R″ is H, alkyl, aryl or

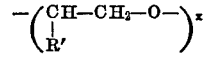

R′ is H, —CH$_3$ or —C$_2$H$_5$
M is H or an alkali metal, ammonium or lower alkylamino (including lower alkanolamino) cation
m is 1 or 2 and
x is an integer of from 1 to 50, preferably 1 to 20.

Such water soluble phosphate ester surfactants are well known in the surfactant art and may be described as the mono- and di-phosphate esters of nonionic surfactants obtained by condensing an alkyleneoxide of 2–4 carbon atoms (i.e. ethylene-, propylene- or butyleneoxide) with a compound having at least 6 carbon atoms and a reactive hydrogen atom.

A convenient and preferred method of preparing such water soluble phosphate ester surfactants, as well as numerous examples of preferred phosphate ester surfactants, is disclosed in U.S. Pats. Nos. 3,004,056 and 3,004,057. As disclosed in said patents such phosphate ester surfactants may be prepared by reacting 1 mole of $P_2O_5$ with about 2 to 4.5 moles of a nonionic surfactant, preferably at a temperature below about 110° C.

As examples of preferred phosphate ester surfactants may be mentioned those prepared by the process of said Pats. 3,004,056 or 3,004,057 from the nonionic surfactants listed below. In this list the abbreviations "E.O.," "Pr. O." and "Bu. O." mean "ethylene oxide," "propylene oxide" and "butylene oxide" respectively and the number preceding same refers to the number of moles of such alkylene oxide reacted with one mole of the specified reactive hydrogen containing compound.

Nonylphenol+2 E.O.
Nonylphenyl+6 E.O.
Nonylphenol+9 E.O.
Nonylphenol+15 E.O.
Nonylphenol+3 Pr. O.+10 E.O.
Nonylphenol+1 Bu. O.+8 E.O.
Dodecylphenol+18 E.O.
Dinonylphenol+7 E.O.
Dinonylphenol+20 E.O.
Diamylphenol+3 Pr. O.
Diamylphenol+8 E.O.
Dipropylphenol+4 E.O.
Dibutylcresol+8 E.O.
2-ethylhexyl alcohol+4 E.O.
2-ethylhexyl alcohol+2 Pr.O.+6 E.O.
n-Octyl alcohol+5 E.O.
Lauryl alcohol+4 E.O.
Lauryl alcohol+15 E.O.
Oleyl alcohol+20 E.O.
Hexadecyl alcohol+12 E.O.
Hexadecyl alcohol+20 E.O.
Octadecyl alcohol+20 E.O.
Oxo tridecyl alcohol:
    (from tetrapropylene)+7 E.O.
    (from tetrapropylene)+10 E.O.
    (from tetrapropylene)+15 E.O.

While the phosphate esters prepared from nonionic surfactants derived from alkylphenols or alcohols, such as those named above, are preferred, the phosphate ester surfactants prepared from nonionics such as the following may also be used:

Castor oil+20 E.O.
Tall oil+18 E.O.
Dodecyl mercaptan+9 E.O.
Soya bean oil amine+10 E.O.
Rosin amine+32 E.O.
Coconut fatty acid amine+7 E.O.
Coconut fatty acid+10 E.O.
Dodecyl benzene sulfonamide+10 E.O.
Decyl sulfonamide+6 E.O.
Oleic acid+5 E.O.
Stearic acid+12 E.O.
Polypropylene glycol (30 oxypropylene units)+10 E.O.

The alkylvinyl ether polymer employed as the other essential component of the compositions of the present invention may, as stated above, be a homopolymer of an alkyl vinyl ether of the formula RO—CH=CH$_2$, wherein R is an alkyl group of 1 to 18 carbon atoms, as examples thereof may be mentioned the homopolymers of:

methylvinyl ether
    ethylvinyl ether
    n-propylvinyl ether
    isopropylvinyl ether
    n-butylvinyl ether
    isobutylvinyl ether
    amylvinyl ether
    hexylvinyl ether
    octylvinyl ether
    decylvinyl ether
    dodecylvinyl ether, and
    octadecylvinyl ether There may also be used copolymers of two or more of such vinyl ethers such as a copolymer of:

ethylvinyl ether and isobutylvinyl ether
ethylvinyl ether and dodecylvinyl ether
isobutylvinyl ether and octadecylvinyl ether A particularly preferred type of vinyl ether copolymer is the copolymer of such alkylvinyl ethers with maleic anhydride. Such vinyl ether/maleic anhydride copolymers are well known in the art, having first been described in U.S. Pat. 2,047,398. Of these the copolymer of methylvinyl ether and maleic anhydride is particularly preferred, although it is feasible to use copolymers of other alkylvinyl ethers with maleic anhydride such as the copolymer of:

ethylvinyl ether and maleic anhydride
isobutylvinyl ether and maleic anhydride
dodecylvinyl ether and maleic anhydride, or
octadecylvinyl ether and maleic anhydride The compositions of the present invention are readily prepared by intimately mixing, in solution in a volatile organic solvent, from 1 to 5 parts by weight (preferably from 1 to 4 parts by weight) of a water soluble phosphate ester surfactant, described above, with 1 part by weight of an alkyl vinyl ether polymer described above. Not more than about 5 parts by weight of the phosphate ester surfactant should be used per part by weight of vinyl ether polymer, since when higher amounts of the phosphate ester surfactant are used the resulting compositions, and films therefrom, exhibit substantial tack and have pressure-sensitive adhesive properties. For the production of materials having maximum hardness and gloss we prefer to use up to about 4 parts by weight of phosphate ester surfactant per part by weight of vinyl ether polymer.

The mixing of the phosphate ester surfactant and the alkyl vinyl ether polymer may be effected in any inert volatile solvent or mixture of solvents in which the resulting mixture is soluble. In order to facilitate drying of films or coatings produced from the novel compositions of the present invention, we prefer to use solvents having a boiling point below about 100° C., although solvents having a boiling point of up to about 300° C. can be used. Suitable preferred solvents are ketones such as acetone, 2-butanone, 2-pentanone, 3-pentanone, 3-methyl-2-butanone, 2-pentanone, 3-methyl-2-pentanone, 4-methyl-2-butanone, 3-pentanone, 2,4-dimethyl-3-pentanone, 2-methyl-3-pentanone, 2-hexanone, 5-methyl-2-hexanone, 3-hexanone, and 5-methyl-3-hexanone; esters such as methyl acetate, ethyl acetate, n-propyl acetate, n-butyl acetate, isobutyl acetate, 2-butanol acetate, amyl acetate, isoamyl acetate, methyl propionate, ethyl propionate, propyl propionate, isopropyl propionate, butyl propionate, isobutyl propionate, methyl butyrate, ethyl butyrate, propyl butyrate, methyl isobutyrate, ethyl isobutyrate and n-propyl isobutyrate; alcohols of from 1 to 6 carbon atoms such as methanol, ethanol, 1-propanol, 2-propanol, 1-butanol, 2-butanol, 2-methyl-1-propanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, 3-hexanol, 2-hexanol, 2-methyl-2-pentanol, 4-methyl-2-pentanol, and 2,3-dimethyl-2-butanol. In order to reduce the cost of the solvent, it is frequently advantageous to employ a mixture of one or more of the above ketones, esters or alcohols with an aromatic solvent, i.e. benzene, toluene or other volatile alkylated benzenes, such as xylene and highly aromatic solvents of petroleum origin such as mineral spirits or textile spirits.

The order in which the several components of the compositions of the present invention are dissolved and mixed is not critical. Separate solutions of the alkyl vinyl ether polymer and the phosphate ester surfactant may be prepared and either solution added to and mixed with the other. Since the alkyl vinyl ether polymers are generally quite readily dispersible in volatile aromatic solvents, a convenient method of preparing the compositions of the present invention is to disperse the alkyl vinyl ether polymer in an aromatic solvent and add to this dispersion a solution of the phosphate ester surfactant in a ketone, ester of alcohol. As illustrated in Examples 1 and 5 below, in order to use only a single mix tank, it is feasible to first dissolve one component, say the alkyl vinyl ether polymer, in the solvent and then add the other component to and dissolve it in such solution. The solution or dispersion of the components in the solvents, and the mixing of the components in solution, may be effected at room temperature, although slightly elevated temperatures may be employed if desired. It is unknown whether the compositions of the present invention so produced are simple mixtures or a partial reaction mixture or complex.

The details of the present invention will be apparent from the following specific examples of preferred embodiments thereof.

EXAMPLE 1

25 g. of a 40% solids solution in toluene of the copolymer of octadecyl vinyl ether and maleic anhydride, having a specific viscosity of .05–0.1 (determined on a solution of 1 g. of the copolymer in 100 ml. of toluene at 25° C.) were mixed with 15 g. of methyl ethyl ketone, 10 g. of the partial sodium salt of the phosphate ester surfactant, produced by reacting in the manner described in Example 6 of U.S. Pat. 3,004,057, 1 molar proportion of $P_2O_5$ with 4 molar proportions of the nonionic surfactant obtained by condensing 1 mole of nonylphenol with 6 moles of ethylene oxide, were then added and the mixture stirred for 1 hour. The resultant solution was light pink and clear. Coatings were made on glass with this solution using a 3-mil Bird applicator and the resultant films dried at 120° C. for 3 minutes. The dried films were clear, glossy and water dispersible.

The phosphate ester surfactant used had the following analysis:

|  | Percent |
| --- | --- |
| Monoester | 20.8 |
| Diester | 31.7 |
| Unreacted nonionic | 35.5 |
| Moisture | 12 | pH—5–6.

EXAMPLE 2

200 g. of the copolymer of methyl vinyl ether and maleic anhydride having a specific viscosity in the range of 0.1–0.5 (Gantrez AN–119 manufactured by GAF Corporation) were slurried in 1200 g. of toluene, 400 g. of the same phosphate ester surfactant used in Example 1 were dissolved in 1200 g. of acetone. When both amber to clear mixtures were uniform they were mixed together. The resultant mixture was a deep red solution which on standing became pale amber.

To 400 g. of the thus prepared solution there was added 12 g. of colloidal silica (Cab-O-Sil M–5 manufactured by Cabot Corp.) and 40 g. of a rutile titanium dioxide pigment (titanium dioxide R–760 manufactured by New Jersey Zinc Co.). The resultant mixture (total solids content 27.5%) had a viscosity, as measured on the Brookfield viscosimeter RVT using the No. 1 spindle, of 24 cps. at 10 r.p.m., 27.5 cps. at 20 r.p.m., and 38.2 cps. at 50 r.p.m. This mixture was coated on Dissolvo (a paper like water soluble film manufactured by Gilbreth Industries, Philadelphia, Pa.) using a 1.5 mil Bird applicator. The coating was then dried for 3 minutes at 120° C. Test results on the thus coated Dissolvo showed improvements in stiffness, opacity and water and solvent holdouts as follows:

TABLE 1

| Property | Untreated Dissolvo | Coated Dissolvo |
| --- | --- | --- |
| Basis weight (TAPPI T 410) (lb./3,000 sq. ft.) | 44.7 | 57.5 |
| Opacity (TAPPI T 425) | 66.6 | 84.2 |
| Stiffness—(Basis weight divided by inches vertical deflection by gravity of a 5″ wide sheet, 4″ overhang) | 12.4 | 19.2 |
| Dispersible in water | Yes | Yes |
| Holdout (TAPPI T 432Mod) (minutes to absorb a drop of solvent): | | |
| Water | (¹) | (²) |
| Acetone | 0.1 | 0.5 |
| Toluene | 0.1 | (³) |

¹ Instantaneous.
² Before the drop can be absorbed, the sheet dissolves and is absorbed.
³ As for water.

EXAMPLE 3

Five gallons of a coating solution was prepared in the same manner as in Example 2, using the same materials and same relative amounts thereof except that sufficient additional toluene and acetone (in equal parts by weight) were employed to reduce the total solids content of the finished coating solution to 22.5%. This coating composition was coated on Dissolvo using a pilot plant Meyer rod coater at a speed of 20 f.p.m. Test results on the thus coated Dissolvo and the uncoated Dissolvo were as follows:

TABLE 2

| Property | Untreated Dissolvo | Coated Dissolvo |
| --- | --- | --- |
| Basis weight (TAPPI T 410) (lb./3,000 sq. ft.) | 33.1 | 37.8 |
| Porosity (TAPPI T 460) (sec./100 cc. air) | 2.1 | 22.5 |
| Opacity (TAPPI T 425) | 68 | 80 |
| Bursting strength (TAPPI T 403) (p.s.i.) | 11.4 | 12.7 |
| Dispersible in water | Yes | Yes |

EXAMPLE 4

A series of three coating compositions were prepared by dissolving the same copolymer of methyl vinyl ether and maleic anhydride, and the same phosphate ester surfactant, as used in Example 2, in acetone and toluene respectively, and mixing the thus prepared solutions. Each of these coating compositions was then coated on 20 sub bond paper using a 1.5 mil Bird applicator and the coatings dried 3 minutes at 120° C. Specimens of the thus coated paper were then heat sealed (coating to coating) on a Sentinel Model 12AS heat sealer at 300° F., 0.5 sec. and 40 p.s.i. All the coatings were hard and glossy, and when the heat sealed plies were separated, all coatings produced 100% fiber failure. The composition of these coating solutions, in parts by weight, are given in Table 3:

TABLE 3

| Coating | A | B | C |
| --- | --- | --- | --- |
| Component: | | | |
| Copolymer | 100.0 | 100.0 | 100.0 |
| Acetone | 393.1 | 446.2 | 501.0 |
| Phosphate ester surfactant | 280.5 | 341.0 | 398.0 |
| Toluene | 393.1 | 446.2 | 501.0 |

EXAMPLE 5

A six gallon batch of coating solution was prepared as follows: 2000 g. of the copolymer of methyl vinyl ether and maleic anhydride, the same as that used in Example 2, was dissolved in five gallons of methyl ethyl ketone. 4540 g. of the same phosphate ester surfactant which was used in Example 1 was then added to this solution and stirring continued for 30 minutes. There was thus obtained a scarlet solution which was stored in gallon jugs. The viscosity of this solution (Brookfield LVF viscosimeter using No. 4 spindle at 12 r.p.m.) was 5400 cps.

50 g. of the thus prepared solution was further diluted in 66 g. of methyl ethyl ketone. A sheet of kraft paper was then saturated with this dilute solution by dipping in the solution then running between squeeze rolls and the sheet dried at 130° C. for 1.5 minutes. Pickup (by weight difference) was noted as 25% of the weight of the dried saturated sheet. The bursting strength of the dried saturated sheet (TAPPI T 403) was 86 p.s.i., as compared with 23 p.s.i. for the unsaturated sheet.

EXAMPLE 6

The effect of the molecular weight of the copolymer of methyl vinyl ether and maleic anhydride was investigated by preparing three coating compositions using a low molecular weight grade of such copolymer, a medium molecular weight grade thereof and a high molecular weight grade thereof. These compositions were prepared in the manner described in Example 2 above and were coated and tested for remoistenability and adhesion in the manner described in greater detail in Example 7 below. The copolymers of methyl vinyl ether and maleic anhydride used in their preparation were commercially available copolymers; Gantrez AN–119, Gantrez AN–139 and Gantrez AN–179 manufactured and sold by GAF Corporation. Gantrez AN–119 is a low molecular weight grade copolymer having a specific viscosity[1] in the range of 0.1–0.5, Gantrez AN–139 is a medium molecular weight grade of copolymer having a specific viscosity in the range of 1.0–1.4, and Gantrez AN–179 is a high molecular weight grade of copolymer having a specific viscosity in the range of 3.5–4.5. As mentioned in Example 1 above the specific viscosity of the copolymers was determined on a solution of 1 g. of the copolymer in 100 ml. of methyl ethyl ketone at 25° C. The composition of these coating compositions and the test results thereon are given in Table 4.

TABLE 4

| Coating composition | A | B | C |
|---|---|---|---|
| Component (parts by weight): | | | |
| Copolymer: | | | |
| Gantrez AN–119 | 2.5 | | |
| Gantrez AN–139 | | 2.5 | |
| Gantrez AN–179 | | | 2.5 |
| Toluene | 20.9 | 20.9 | 20.9 |
| Phosphate ester surfactant (same as in Example 1) | 5.7 | 5.7 | 5.7 |
| Acetone | 20.9 | 20.9 | 20.9 |
| Total solids content (percent) | 15 | 15 | 15 |
| Test result | | | |
| Property: | | | |
| Remoistenability | 4 | 4 | 1 |
| Adhesion | 0 | 1 | 0 |

In preparing the above coating compositions it was noticed that the viscosity of the composition increases as the molecular weight of the copolymer was increased. It was also noted as evidenced by the greater "Remoistenability" of the coatings produced with Composition C that an increase in the molecular weight of the copolymer increased the water sensitivity of the coatings.

While the compositions described in the foregoing Examples 1 through 6 produced satisfactory coatings for many purposes, they had relatively poor resistance to hygroscopic blocking, i.e. the tendency of a coating under conditions of high humidity to form an adhesive bond to an adjacent sheet with which it may be in contact, as in storage. We have found however compositions having satisfactory hygroscopic blocking resistance are obtained by incorporating an appropriate amount of certain hydrocarbon polymer type synthetic resins. The optimum amount of such hydrocarbon polymer type synthetic resins can be ascertained most readily by preliminary test. We have found that for 1 part by weight of combined alkyl vinyl ether polymer and phosphate ester surfactant up to 3 parts by weight of such hydrocarbon polymer type synthetic resins can be tolerated. In order to improve the hygroscopic blocking properties of the compositions we prefer to add from about 0.25 to about 2.0 parts by weight of such hydrocarbon polymers per part by weight of combined alkyl vinyl ether polymer and phosphate ester surfactant. Specific preferred compositions containing such hydrocarbon polymer type resins are described in Example 7 which follows:

Example 7

Base coating solutions, whose composition is given in Table 5 below, were prepared by the following procedures:

Method a—The copolymer of methyl vinyl ether and maleic anhydride was slurried in the specified amount of toluene; the phosphate ester surfactant was dissolved in the specified amount of acetone; the surfactant solution was then added to the copolymer dispersion and the resultant solution mixed for a minimum of one hour.

Method b—The copolymer was dissolved in the specified amount of methyl ethyl ketone; the surfactant is added thereto and the resultant solution is mixed for a minimum of one hour.

To the thus prepared base coating solutions there was then added a 50% by weight solution of the resin noted in the solvent noted, and mixing continued until a uniform solution was obtained.

Materials used:

Copolymer: The copolymer used in all compositions was the copolymer of methyl vinyl ether and maleic anhydride having a specific viscosity in the range of 0.1–0.5; i.e.—Gantrez AN–119 copolymer manufactured by GAF Corporation.

Surfactant: The phosphate ester surfactant used in all the compositions was the partial sodium salt (used in Example 1) of the phosphate ester produced by reacting 1 mole of $P_2O_5$, in the manner described in Example 6 of U.S. Pat. 3,004,057, with 4 moles of the nonionic surfactant produced by condensing 1 mole of nonylphenol with 6 moles of ethylene oxide.

Picco 6140–3 (identified in the table as "6140") is a hydrocarbon polymer, prepared by polymerization of olefinic fractions derived from petroleum cracking, manufactured by Pennsylvania Industrial Chemical Co. having the following specifications:

| | | |
|---|---|---|
| Softening point, ring and ball | ° C | 100 |
| Color (coal tar scales) | | 2–3 |
| Specific gravity | | 1.06 |
| Iodine No. | | 100 |
| Ash | percent | <0.5 |
| Acid No. | | <1 |
| Saponification No. | | <1 |
| Refractive index @ 25° C. | | 1.60 |
| Flash point | ° F | 425 |

Piccotex 120 (identified in the table as "120") is an alpha methyl styrene/vinyl toluene copolymer manufactured by Pennsylvania Industrial Chemical Co. having the following specifications:

| | | |
|---|---|---|
| Softening point, ring and ball | ° C | 120 |
| Color (Gardner scale), max. | | 1 |
| Specific gravity | | 1.04 |
| Acid No. | | <1 |
| Saponification No. | | <1 |
| Bromine No. | | <1 |
| Ash | percent | <0.1 |
| Refractive index @ 25° C. | | 1.583 |
| Ozone No. | | 0 |
| Flash point | ° F | 500 |

Velsicol XL–30 (identified in the table as "XL–30") is a highly aromatic hydrocarbon polymer derived from

[1] Determined on a solution of 1gm. of the copolymer in 100 ml. of methyl ethyl ketone at 25° C.

refined petroleum stocks manufactured by Velsicol Corp. having the following specifications:

| | |
|---|---|
| Softening point, ring and ball °C | 102–107 |
| Specific gravity | 1.04–1.07 |
| Color (Gardner scale) | 6–8 |
| Average molecular weight | 3400 |
| Saponification No. | 0–2 |
| Acid No. | 0–2 |
| Iodine No. | 50–100 |

Coatings of the solution of the additive resin in the base coating solution were made using a 3 mil Bird applicator on a 20 lb./17″ x 22″—500 sheet ream (20 substance) white bond paper. The coatings were dried three minutes at 120° C.

The test results recorded in Table 5 were obtained by the following procedures:

Remoistenability: 3″ x 1″ strips of the coated paper were remoistened with a brush wetting device (Labelor 106) containing distilled water. The remoistened coating was immediately placed on the surface of a sheet of 24 substance white wove envelope stock and rolled back and forth with a PSTC 4.5 lb. roller. The bond was allowed to remain for one minute then pulled apart and rated as follows:

0 = 100% fiber tear
1 = 70–90% fiber tear
2 = 40–60% fiber tear
3 = 10–30% fiber tear
4 = adhesion but no fiber tear to very slight fiber tear
5 = failure of adhesive from base.

Tests were run in triplicate and the average taken.

Adhesion: This test is run and reported in the same manner as that for remoistenability—*except* bonds are allowed to remain for 24 hours at 23° C. and 50% relative humidity before pulling apart.

Caliper: TAPPI T–411 using a TMI Model 549M micrometer with loading device removed.

Hygroscopic blocking: 1″ x 3″ strips of coated paper are conditioned for six hours at 23° C. and 86.5% relative humidity; the coated side is then placed on 24 substance white wove envelope stock and subjected to a load of one pound per square inch for 18 hours while maintaining the same conditions of 23° C. and 86.5% relative humidity. The sample is then separated from the envelope stock and rated as follows:

F—Free
C—Cling
S—Slight fiber tear
M—Moderate fiber tear
H—Heavy fiber tear
B—Blocked This hygroscopic blocking test is run in sextuplicate and the average taken.

TABLE 5

| Composition | A | B | C | D | E |
|---|---|---|---|---|---|
| Coating base: | | | | | |
| Copolymer, parts | 200 | 200 | 200 | 200 | 200 |
| Toluene, parts | | | 1,174 | 674 | |
| Surfactant (88% active), parts | 454 | 454 | 452 | 452 | 454 |
| Acetone | | | 1,174 | 674 | |
| Methyl ethyl ketone | 1,890 | 1,890 | | | 1,890 |
| Mixing procedure | b | b | a | a | b |
| Percent solids | 23.9 | 23.9 | 20 | 30 | |
| Formulation (coating base plus additive resin): | | | | | |
| Parts, coating base | 30 | 30 | 20 | 30 | 30 |
| Additive: | | | | | |
| Type | 6140 | XL–30 | 6140 | 6140 | 120 |
| Parts (50% sol) | 9 | 9 | 8 | 9 | 9 |
| Solvent | MEK | MEK | Toluene | Toluene | MEK |
| Parts, additional solvent | 15 | 15 | | 6 | 24 |
| Test results | | | | | |
| Property: | | | | | |
| Caliper (mils) | | | 0.75 | 1.5 | 0.5 |
| Remoistenability | 2 | 3 | 0.5 | 1 | 0.7 |
| Adhesion | 2 | 3 | 0 | 2 | 0.3 |
| Hygroscopic blocking | F–C | C–S | F | C–H | C |

We claim:

1. A film-forming coating composition consisting essentially of a solution in an inert, volatile, organic solvent of about:

(A) one part by weight of a copolymer of methyl vinyl ether and maleic anhydride;

(B) one to five parts by weight of a water-soluble phosphate ester of a surfactant of the formula:

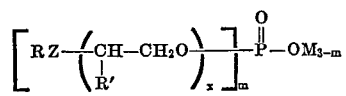

wherein:
RZ represents the hydrophobic residue of a compound having an active hydrogen atom and is an alkylphenoxy group having from 6 to 20 alkyl carbon atoms,
R′ = H, —CH$_3$, —C$_2$H$_5$,
M = H or an alkali metal, ammonium or lower alkylamino cation,
$m$ = 1 or 2,
$x$ = 1 to 50, and (C) from 0.25 to 2.0 parts by weight per part of weight of (A) and (B) combined, of a hydrocarbon polymer synthetic resin having hygroscopic blocking properties selected from the group consisting of alpha methyl styrene/vinyl toluene copolymer, aromatic hydrocarbon polymer derived from refined petroleum stocks, and hydrocarbon polymer prepared by polymerization of olefinic fractions derived from petroleum cracking.

2. A composition as defined in claim 1 wherein RZ in said phosphate ester is an alkoxyphenoxy group having 6 to 20 alkyl carbon atoms.

3. A composition as defined in claim 1 additionally containing at least one member selected from the group consisting of pigments and fillers.

4. A composition as defined in claim 1 wherein said solvent is a ketone, ester or alcohol.

5. A composition as defined in claim 1 wherein said solvent is a ketone, ester or alcohol in admixture with an aromatic solvent.

6. A composition according to claim 1 wherein said hydrocarbon polymer synthetic resin is an aromatic hydrocarbon polymer derived from refined petroleum stocks.

References Cited

UNITED STATES PATENTS

| | | | |
|---|---|---|---|
| 3,497,574 | 2/1970 | Press | 260—897 |
| 3,462,342 | 8/1969 | Cooper et al. | 161—216 |
| 3,004,057 | 10/1961 | Nunn | 260—461 |

SAMUEL H. BLECH, Primary Examiner

C. SECCURO, Assistant Examiner

U.S. Cl. X.R.

117—155 UA; 260—27 R, 29.6 H, 30.6 R, 32.8 R, 33.4 R, 33.6 UA, 41 A, 41 B, 78.5 BB, 80.3 E, 91.1 M, 874